United States Patent
Keshner et al.

(10) Patent No.: US 9,553,439 B2
(45) Date of Patent: Jan. 24, 2017

(54) COMPACT, HIGH POWER, HIGH VOLTAGE, LONG-DISTANCE ELECTRICAL TRANSMISSION LINE STRUCTURE

(71) Applicants: Marvin S Keshner, Sonora, CA (US); Erik Vaaler, Redwood City, CA (US)

(72) Inventors: Marvin S Keshner, Sonora, CA (US); Erik Vaaler, Redwood City, CA (US)

(*) Notice: Subject to any disclaimer, the term of this patent is extended or adjusted under 35 U.S.C. 154(b) by 153 days.

(21) Appl. No.: 14/135,538

(22) Filed: Dec. 19, 2013

(65) Prior Publication Data

US 2015/0180217 A1   Jun. 25, 2015

(51) Int. Cl.
*H02G 5/00* (2006.01)
*H02G 9/08* (2006.01)
*H02G 5/06* (2006.01)

(52) U.S. Cl.
CPC . *H02G 9/08* (2013.01); *H02G 5/06* (2013.01)

(58) Field of Classification Search
CPC ............... H01B 3/16; H01B 3/56; H01B 9/06; H01H 33/22; H05K 3/16; H05K 5/00; H02G 15/22; H02G 15/20; H02G 15/02; H02G 15/06; H02G 5/007; H02G 5/005; H01R 13/512; H01R 13/59; H01R 4/021; H01R 4/023; H02B 1/20
USPC .... 174/25 G, 26 G, 16.2, 17 GF, 88 B, 90 B
See application file for complete search history.

(56) References Cited

U.S. PATENT DOCUMENTS

| | | | |
|---|---|---|---|
| 1,263,941 A | 4/1918 | Schmidt | |
| 1,967,340 A | 7/1934 | Van Splunter | |
| 2,039,025 A * | 4/1936 | Papst | 174/70 B |
| 2,407,142 A * | 9/1946 | Cole | H02G 5/06 174/16.2 |
| 2,482,310 A * | 9/1949 | Adam | H02G 5/06 174/16.2 |
| 3,349,168 A | 10/1967 | Rehder | |
| 3,366,725 A | 1/1968 | Watterson | |
| 3,751,578 A | 8/1973 | Hoffmann | |
| 3,767,837 A * | 10/1973 | Graybill | 174/27 |
| 4,078,184 A | 3/1978 | Phelps | |
| 4,085,988 A * | 4/1978 | Gamble | 439/94 |
| 4,153,812 A | 5/1979 | Persson | |
| 4,404,423 A | 9/1983 | Sakakibara | |
| 4,414,424 A * | 11/1983 | Mizoguchi et al. | 174/28 |
| 4,886,940 A * | 12/1989 | Gagnon | H02G 5/007 174/16.2 |

(Continued)

*Primary Examiner* — Angel R Estrada
*Assistant Examiner* — Pete Lee
(74) *Attorney, Agent, or Firm* — Shalini Venkatesh

(57) ABSTRACT

Embodiments generally relate to long-distance, 3-phase, AC electricity transmission structures. In one embodiment, the structure comprises an array of beams, the array comprising a sub-array of 3N active beams, wherein N is an integer, one passive beam on the right side of the sub-array of active beams; and one passive beam on the left side of the sub-array of active beams. The centers of the cross-section of each of the active and passive beams lie in a single plane. In another embodiment, the structure comprises an array of 3N metal active beams, wherein N is an integer; and a tunnel of rectangular cross-section with either 90 degree or rounded corners. The array of beams is mounted within the tunnel, and the two side walls of the tunnel are lined with a highly conductive metal having a thickness similar to the thickness of metal used in the active beams.

25 Claims, 9 Drawing Sheets

(56) References Cited

U.S. PATENT DOCUMENTS

| | | | | |
|---|---|---|---|---|
| 5,151,043 A * | 9/1992 | Morgan | ............... | H02G 5/04 |
| | | | | 439/100 |
| 5,173,572 A * | 12/1992 | Martin | ............... | H02G 5/10 |
| | | | | 174/16.2 |
| 5,936,201 A | 8/1999 | Yekema | | |
| 7,978,482 B2 * | 7/2011 | Mason | ............... | 361/833 |
| 2011/0290558 A1 * | 12/2011 | Jur et al. | ............... | 174/99 B |

* cited by examiner

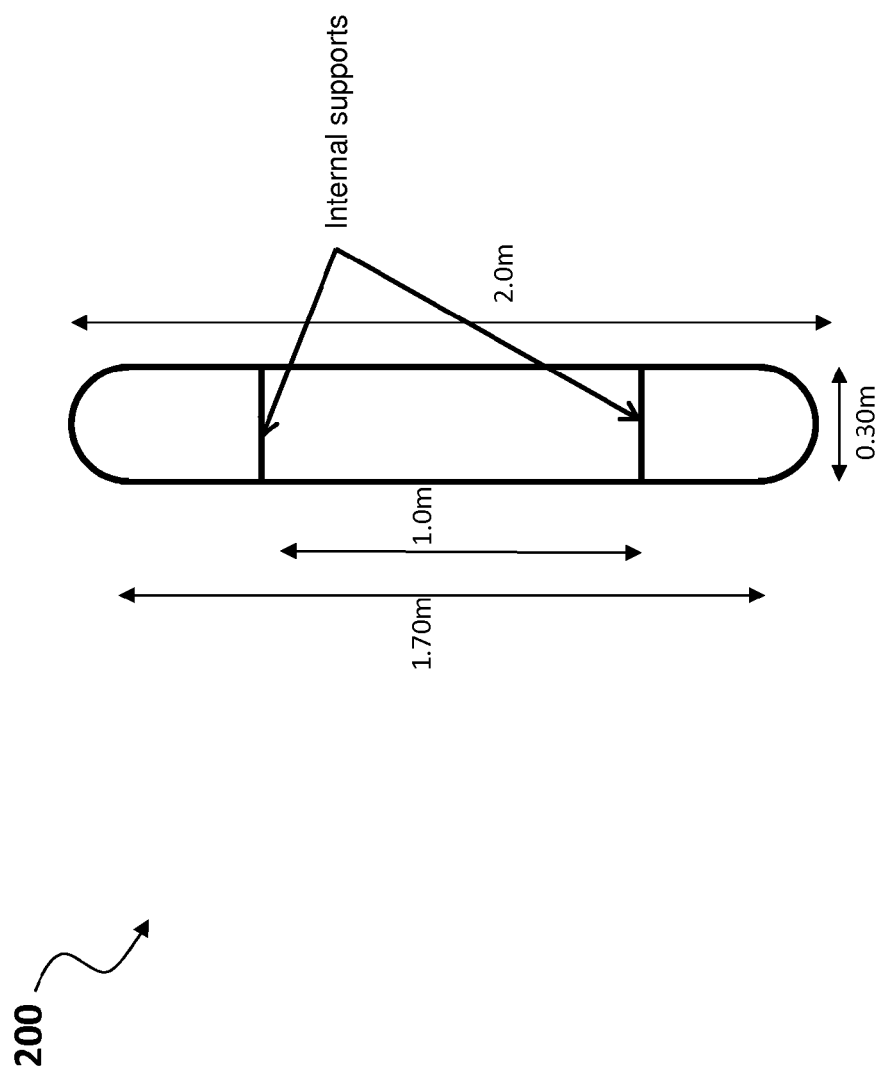

COMPACT, HIGH POWER, HIGH VOLTAGE, LONG-DISTANCE ELECTRICAL TRANSMISSION LINE STRUCTURE

FIELD OF INVENTION

This invention relates to an electricity transmission structure, and specifically to a compact, three phase electrical power transmission at very high power (such as 50 GW), at high voltages (such as 765 kV), and over long distances (500 km or more).

BACKGROUND

High voltage and high power, 50 Hz or 60 Hz, 3-phase, long-distance electrical power transmission lines are common. They typically consist of 3 or 6 groups of wires with one or two groups of wires for each of the 3 phases. Each group of wires can contain 1-4 wires for each of the 3 phases. The groups of wires are usually suspended from very tall metal towers by long insulators. These transmission lines operate at high voltages, such as 115 kV, 230 kV and 765 kV and at power levels up to 1-2 Giga watts.

Conventional electrical power transmission lines operating above 230 kV usually consist of three groups of wires on one side of the metal tower and another three groups of wires on the other side. Due to the inherent asymmetry of the arrangement of the groups of wires, some phases experience an electrical transmission impedance that is higher than the impedance for other phases. Often this impedance imbalance is corrected along the length of the transmission line by adding capacitance to null the unequal amounts of inductance created by the transmission line for each phase.

Not only is the impedance of conventional electrical transmission lines unbalanced, it is also high compared to the resistance of the load. Therefore, the transmission line is highly inductive. This high inductance must be balanced by adding capacitors along the length of the transmission line for an efficient transmission of power.

Conventional transmission lines mounted on lattice towers require a large right of way, are unsightly, and create significant magnetic fields and health risks in their local area. They also are expensive to maintain and subject to outages due to high winds, ice storms and snow. They are relatively expensive—about $1.6 M per GW per km of length for long distance transmission lines. The percentage of the cost of a conventional transmission line that is devoted to the active elements (the wires) is only about 12%. Thus, a radically new design could dramatically lower the cost of transmitting electrical power over long distances.

Underground transmission lines also exist, but are more expensive than conventional above ground transmission lines. For high voltages and high power, it is expensive to insulate the underground conductors, to shield them from water penetration and to provide for sufficient thermal conductivity to enable the conductors to carry high power.

In the prior art, extensive work has been done with gas insulated three-phase transmission lines for high voltage, high power and long-distance electricity transmission. Most of this prior art uses conductors that are large, hollow, cylindrical tubes, rather than stranded wire. The tubes are in multiples of three, arranged in a triangular cross-section, and located inside a cylindrical metal conduit. The combination of the symmetric, triangular arrangement of conductors and the identical geometry from each conductor to the enclosing metal conduit should assure that the impedance of each conductor is the same.

Unfortunately, practical implementations of large conductors, positioned symmetrically inside a cylindrical metal tube and insulated for high voltage are difficult to achieve and expensive. To transmit power levels above 10 GW, the conducting tubes need to be large. The conducting cylindrical conduit that encloses the tubes needs to be even larger. To preserve the symmetry, the insulators need to have triangular, hexagonal or higher order symmetry. Thus, the entire structure becomes very difficult to implement over a long distance at a competitive cost.

Rectangular geometries are much more practical to implement at a reasonable cost. However, while obtaining an impedance balance for a 3-phase electrical transmission system is conceptually easy with multiples of 3 conductors arranged in a cylindrically symmetrical geometry, it is very difficult in a rectangular geometry. An array of conductors in a rectangular geometry will have one conductor at each end. The impedance of these end conductors will be different than the impedance of any of the conductors in the middle of the array. Since there are only two ends, it is not possible to have one of the end conductors carry each of the 3 phases. Hence, the conductors for each phase will not have the same impedance and there will be an imbalance among the phases. Also, the electric current tends to flow on conductor surfaces that are adjacent to other conductor surfaces. Thus, the outsides of the end conductors will carry little current, which is inefficient and costly.

In the prior art, there are examples of large, hollow, rectangular bus bars used as conductors for transmitting 3-phase electrical power over short distances and at low voltages to electric arc furnaces. Electric arc furnaces depend on a careful balance among the impedance of the transmission system for each phase. Various compensation schemes have been developed for creating a balance among the 3-phases, even though the transmission system itself is not balanced among the 3 phases. This compensation approach may be acceptable for the short, low-voltage, high current transmission system required for an electric arc furnace. However, it is not practical or cost effective for a long-distance, high current and high voltage electrical transmission line.

There are other issues that must be solved for long-distance, high voltage and high power electrical transmission lines. Conventional above-ground transmission lines have a very large air space between conductors to minimize electric arcs triggered by fog, falling rain and snow. Conventional underground transmission lines are wrapped with many layers of solid insulation (e.g. plastic, tar paper, etc). Underground lines that are wrapped with insulation have great difficulty implementing an insulation that can withstand extremely high voltage (EHV or 765 kV), that has good thermal conductivity to carry away heat, and that provides sufficient protection from water incursion. Also, this insulation wrapping is expensive.

Finally, a high power electrical transmission structure would require expansion joints for thermal expansion that must flex at least 36,500 times over 100 years. These joints must also conduct very high currents (circa 10,000 amps) and have smooth surfaces that will minimize corona discharge. Prior art solutions are based on flexible, high current conductors like woven cables and bundles of thin sheets of copper that offer flexibility. However, they are often too expensive, will not flex 36,500 times with a very low probability of breaking, and can have edges that promote corona discharge. There are also prior art solutions for thermal expansion of oil and gas pipelines, as shown in FIG. 5. Unfortunately, the solutions used for oil and gas pipelines cannot be used for electrical transmission lines, when the spacing between adjacent lines is small and must be precisely controlled.

SUMMARY

An electricity transmission structure for transmitting about 50 GW of 3-phase, AC electrical power over very long distances (such as 1000 km or more) at typical AC power frequencies, such as 50 or 60 Hz is provided. It is capable of operating at extremely high voltages, such as 765 kV rms, in a very compact space.

BRIEF DESCRIPTION OF THE DRAWINGS

FIG. 2A—A cross-section view of one embodiment of a hollow, rectangular metal beam with rounded ends and an internal support structure.

FIG. 2B—A cross-section view of one embodiment of a hollow, rectangular metal beam with rounded ends and no internal support structure.

FIG. 3B—A cross-section view of an array of 12 active beams and 2 passive beams in a rectangular tunnel, with pairs of insulated posts, mounted at an angle, supporting the beams off the floor of the tunnel and penetrating through the beams to also support the ceiling of the tunnel.

FIG. 3C—A cross-section view of an array of 12 active beams with no passive beams in a rectangular tunnel, the sides of which are lined with thick metal plates that are spaced from the nearest beam by ½ of the distance between adjacent beams.

DETAILED DESCRIPTION

Figure 1:
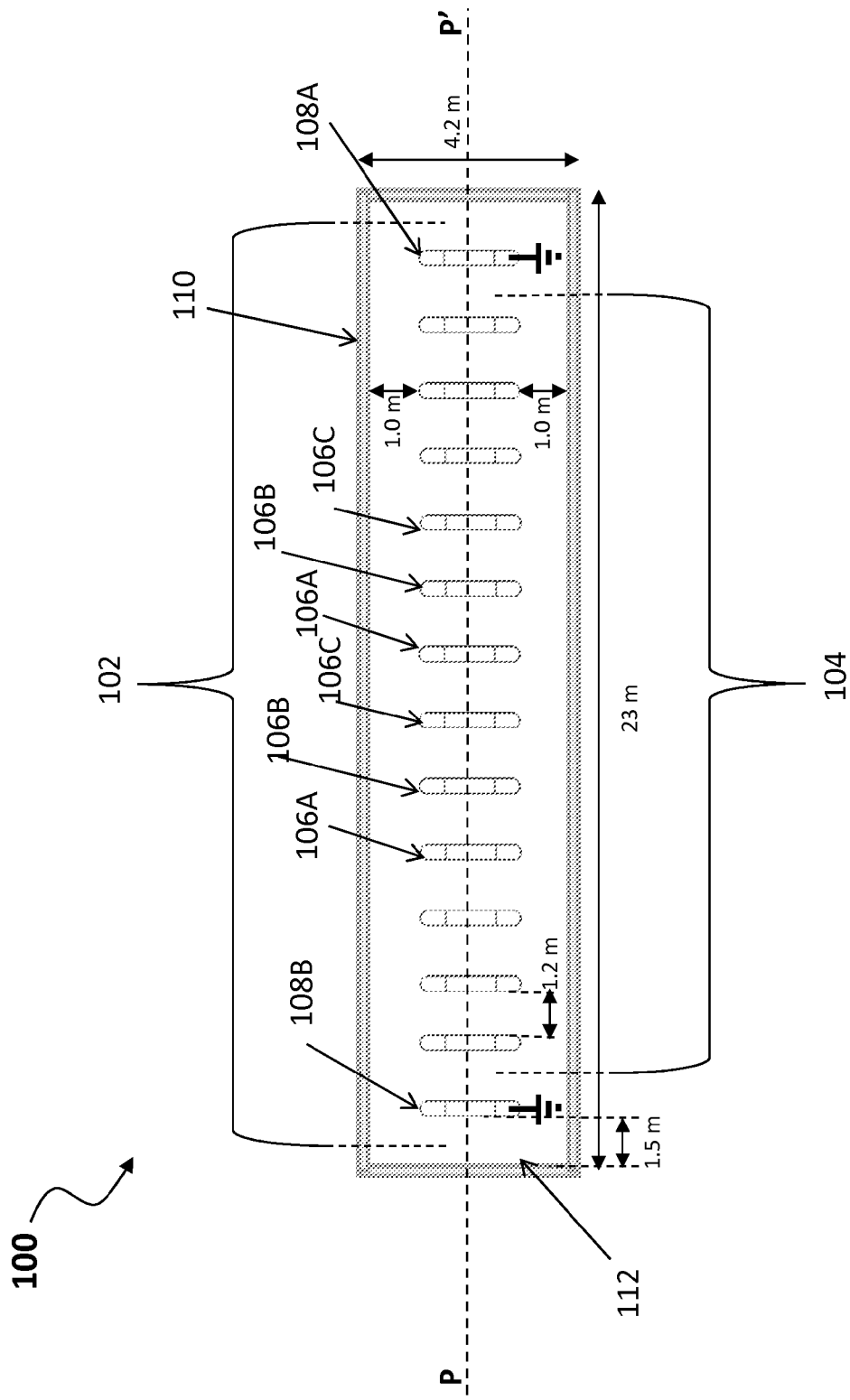
FIG. 1—An array of 12 active beams and 2 passive beams in a rectangular tunnel, shown in cross-section. The space between the beams and between the beams and the tunnel walls is filled with air under normal atmospheric pressure.

In one embodiment, shown as a cross-section view in FIG. 1, the transmission structure 100 consists of a rectangular array 102 of long metal beams that can be 1000 km or more in length. Each beam is an electrical conductor capable of carrying 10,000 amps at full load. The beams are arranged so that the centers of their cross section are in the same plane (indicated by dashed line P P') and the beams are parallel to each other. The array of beams is positioned inside a tunnel 110 with a rectangular cross-section, rather than a circular cross-section, as in much of the prior art. The rectangular tunnel can also have rounded corners, rather than 90 degree corners. The tunnel, which in some embodiments is underground, provides a controlled environment that protects the transmission structure from the outside weather (e.g. snow, lighting, ice, fog, and rain). The tunnel is sealed to prevent water incursion and heated by the heat generated by the resistance of the transmission structure to prevent fog or condensation inside the tunnel.

This controlled temperature and humidity environment within the tunnel allows the beams to be placed close together, and still use air as the insulting medium between the beams. As a result, compared with transmission lines in uncontrolled environments, the entire transmission line structure is more compact. Compared with traditional underground transmission lines, with solid insulation, it is much less expensive. It is sufficiently compact that it can be placed underneath or alongside of existing major highways and share existing right-of-ways.

The rectangular array 102 of beams consists first of a group 104 of active beams, where "active" is defined as a beam that is carrying both voltage and current from the source of electric power to the loads requiring electric power. The number of active beams is a multiple of 3 so that each phase of the 3-phase electric power has the same number of active beams. Beams 106A, 106B and 106C carry the first second and third phases respectively; two such sets of beams are explicitly labeled in FIG. 1. Furthermore, the active beams are all identical in shape and dimension to each other with the identical spacing between the beams.

The rectangular array also consists of two passive beams, 108A, and 108B, where "passive" is defined as a beam that has zero applied voltage, being grounded at each end, and only carries current between the source of electric power and the loads. There is a passive beam on each side of the group of active beams. These two passive beams provide their adjacent active beams with a geometry that makes all of the active beams have the same electrical impedance. For example, an active beam in the center of the group of active beams has a beam on either side. With the passive beams on the sides of the group of active beams, the first and last of the active beams, also have a beam on either side. Thus, the geometry surrounding all of the active beams is identical. As a result, the impedance of the all active beams will be the same. An array with 12 rectangular active beams and 2 rectangular passive beams, inside a rectangular tunnel, is illustrated in FIG. 1.

Without the passive beams, the impedance of the active beams to the far right or far left of the array would be very different than the impedance of the active beams in the center of the array. Also, current would flow on one side of the first and last active beams, but not on the other. With the addition of the two passive beams, the impedance of all active beams is the same. Current will flow on both sides of the first and last active beams. Current will also flow on the surfaces of the two passive beams that are adjacent to the active beams. In addition, the passive beams will conduct any current imbalance among the 3-phases due to unequal loads. Without the passive beams, these potentially very high currents (1,000-10,000 amps) due to load imbalance would have to flow through the earth. Allowing a current imbalance among the 3 phases to flow through the earth may be acceptable in rural areas with low-power transmission lines. It is not acceptable with power levels of 5-50 GW.

Finally, the inclusion of the passive beams eliminates the need for the tunnel 110 to be metallic. The walls 112 can be concrete, or steel-reinforced concrete, which are only slightly conductive. The walls can also be insulating. Eliminating the need for the walls to be a highly conductive metal, like aluminum, reduces the cost of the tunnel significantly. If desired, magnetic shielding can be used with the non-conductive tunnels walls to reduce the intensity of the magnetic fields outside the tunnel.

The beams are hollow and substantially rectangular with rounded corners, with a height that is much greater than the width. In the remainder of this disclosure, the term "rectangular" will be understood to optionally include the presence of rounded corners, as shown in FIGS. 1-3. Rectangular beams can be packed more densely than cylindrical beams or beams of other shapes. Also, when the longer dimensions of the beams are placed adjacent to each other, the electrical impedance of the transmission line formed by the rectangular beams is lower than cylindrical beams, and close to matching the impedance of the electrical load. This enables the beams to be much longer and approach lengths as long as a quarter wavelength of the power frequency (1250 km for 60 Hz.)

Figure 2B:
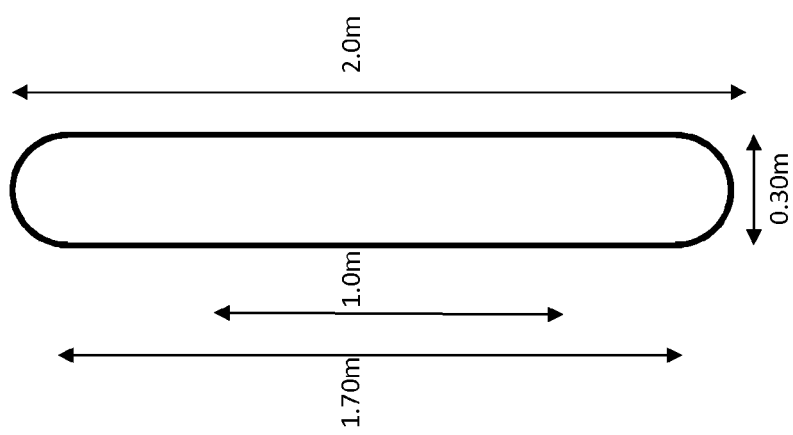

The top and bottom ends of the beams are rounded with a radius that is equal to ½ of the width of the beam to minimize corona discharge. The cross-sectional shape of two embodiments of a beam 200 and 300 is illustrated in FIGS. 2A and 2B. The width of the beam (which is equal to the diameter of the rounded ends) is chosen to be large enough to eliminate corona discharge entirely under normal operating voltages. This greatly reduces the power losses of the transmission structure. The width is also chosen to be small enough to allow corona discharge at the rounded ends of the beams under transient over-voltage conditions. Finally, compared to the spacing between beams, the width of the beams is chosen such that corona discharge will occur at the rounded ends of the beam before either corona discharge or an electric arc will form between the flat sides of the beams. These choices allow the energy of a transient over-voltage to be dissipated safely as corona discharge at the top and bottoms of the beams, rather than as potentially destructive arcs between the flat surfaces of the beams. Each beam is insulated from the adjacent beam (or beams) and from the walls of the tunnel by air at normal atmospheric pressure.

Figure 3A:
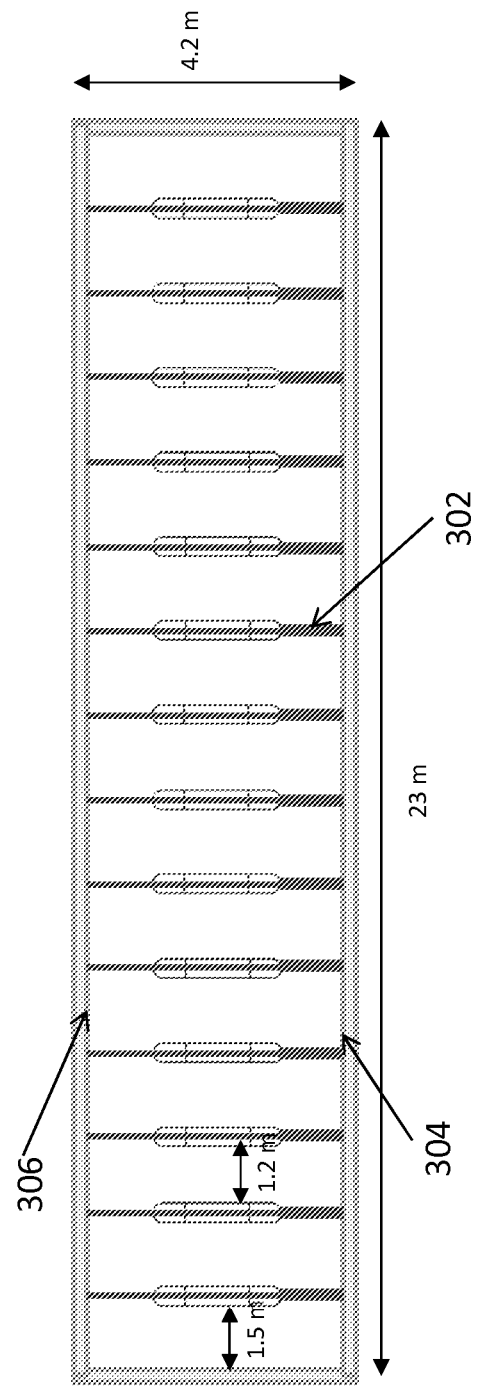
FIG. 3A—A cross-section view of an array of 12 active beams and 2 passive beams in a rectangular tunnel, with insulated posts supporting the beams off the floor of the tunnel and penetrating through the beams to also support the ceiling of the tunnel.
Figure 3B:
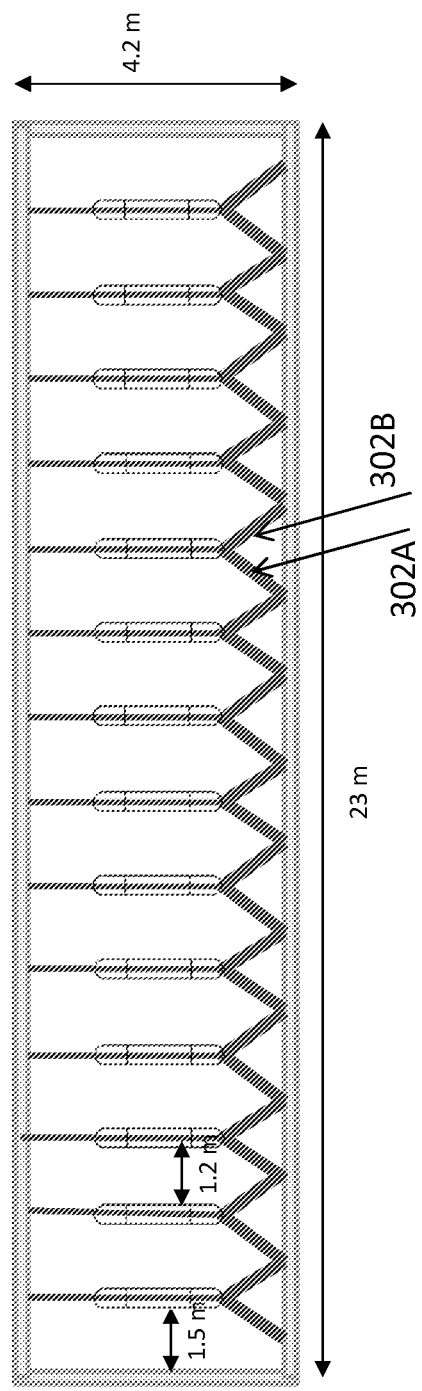
Figure 3C:
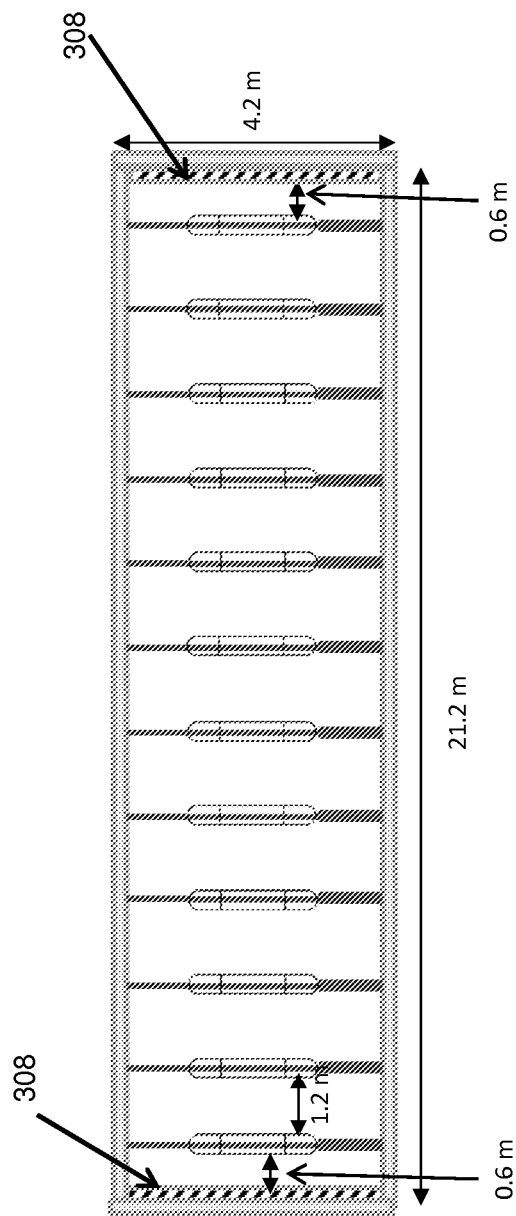

In some embodiments, as shown in FIGS. 3A, 3B and 3C, the beams are supported by insulating posts 302 that hold the beams a fixed distance off the tunnel floor 304. These insulating posts proceed through holes in the bottom and top of the beams, and all the way to the ceiling 306 of the tunnel. Thus, the insulating posts support both the beams and the tunnel ceiling. Each beam can be supported from the floor by a single insulating post 302 positioned vertically, as shown in FIGS. 3A and 3C, or by a pair of posts 302A, 302B mounted at an angle as shown in FIG. 3B. Additional insulating posts can be placed in the air space between beams. These additional insulating posts do not support the beams, but are used to provide additional support for the ceiling. This is shown as a side view in FIG. 4 where the insulating posts that penetrate through the beams are shown as dotted lines through the beams, and the additional insulating posts that are located in the air space between the beams are shown as being hidden by the beams. The insulating posts can made from conventional insulating materials such as fiberglass-epoxy and may be coated with silicone. They may also include silicone shells like those that are commonly used for high-voltage outdoor insulators.

Unlike most underground or above ground tunnels, and unlike the prior art for long-distance, electrical transmission structures, in one embodiment, the tunnel is sealed to resist the incursion of water, insulated from the ambient temperature and heated by the resistive power loss of each of the conducting beams. As a result, the tunnel is dry, the temperature inside the tunnel is significantly above ambient, and the relative humidity is reduced from ambient by the higher temperature. This reduction in relative humidity inside the tunnel prevents conditions that might create fog or condense water inside the tunnel on the tunnel walls and ceiling, on the insulating posts, in the air space between conducting beams, or on the conducting beams. As a result, there is no opportunity for a water film to form on the insulting posts, or for raindrops or snow to form in the air space between conductors. As a result, the length of the insulators, the air space between the conductors and the air space between the conductors and the walls may all be greatly reduced. Please see FIG. 4 for an example of the tunnel construction. In one embodiment, the construction of the ceiling has overlapping ceiling plates that can be sealed to make them water tight. This is a common practice to create water tight concrete structures and is well known. In one embodiment, the thickness of the ceiling is in the range of 0.25-0.5 m, and the ceiling is made of concrete to provide the necessary thermal insulation. The thermal conductivity of the side walls and floor of the tunnel are controlled so that almost all of the heat leaves the tunnel through the ceiling. The thickness and composition of the ceiling material is controlled to achieve a thermal conductivity of roughly 2-4 watts/C-sq m. With the amount of heat produced by the resistance in the beams at full power, this will produce a temperature rise inside the tunnel in the range of 12-24 C.

Conventional high voltage power-line insulators used in outdoor environments are subjected to rain, fog and snow, plus pollutants that tend to coat the insulators and encourage the formation of conducting water films. To provide adequate electrical insulation, the insulators for 765 kV transmission lines are about 3 m long and have a series of silicone shells to break up the formation of water films, resist the formation of conductive coatings (from pollutants and water films), and greatly increase the effective length of any water films that might form. The insulating posts described above and in more detail below are located within the controlled environment of a sealed, heated tunnel. There is no possibility of fog or rain that would coat the insulators with a film of water. Therefore, the insulating posts can have a much shorter path length to ground. This enables the transmission line structure disclosed herein to minimize the height of the tunnel and, thereby, reduce the cost of building the tunnel. FIGS. 3A, 3B, 3C, 4 and 6 show the placement of the insulating posts inside the tunnel.

Finally, each of the 3N active beams (where N is an integer) and the 2 passive beams is created from a series connection of beams of moderate length to form a continuous conductor for the length of the entire transmission line system—often 1000 km or longer. In one embodiment, the beams are aluminum. Each beam is constructed from segments. In one embodiment, the segments are circa 10 m to 12 m long and are welded together to form a continuous, very long beam. Welding provides the best possible connection with the lowest electrical resistance, high resistance to oxidation or corrosion, and great mechanical strength.

The beams will heat and cool depending on the ambient temperature and on the amount of power being transmitted. Thus, there must be a provision for thermal expansion that allows the beams to expand and contract relative to the ground, while maintaining a low resistance, high current connection between individual beams. The individual segments of each long beam are welded at a slight angle so that the long beam meanders to the right and left (as seen from the top of the array). The meander takes the form of a triangle wave so that the spacing between adjacent beams is the same over the length of the beam. When the beam heats up, it attempts to expand and the expansion is absorbed by increasing the amount of meander. When the beam cools, it contracts and reduces the amount of meander. The amount of meander is designed to absorb the thermal expansion from +−40 C of temperature change, and to tolerate one thermal cycle per day for 100's of years without fatigue failure of the metal beam. Please see FIG. 6, which shows the transmission line structure from a top view and the triangle wave meander of the beams from side to side.

In one embodiment, the beams that transmit the electricity are hollow and have a rectangular cross-section, with the height greater than the width. The thickness of the metal in the beams is chosen to be approximately equal to a skin depth at the power transmission frequency (usually 50 or 60 Hz). In one embodiment, the beams have an internal structure in which two members are placed across the width of the beams for additional mechanical strength (FIG. 2A). In another embodiment, when additional strength is not required for handling and transportation, the beams have no internal structure (FIG. 2B). The beams are made of aluminum, which is an excellent conductor of electricity with low resistance, good mechanical strength, light weight and low cost compared with other metals. At 60 Hz. and a temperature of 40 C, its skin depth is approximately 11 mm.

In one embodiment, the height of the beams is 2 m. (See FIGS. 2A and 2B.) This height is chosen to make the beams easy and inexpensive to fabricate. Shorter beams would be more expensive to fabricate per kg of aluminum used. For a given spacing between the beams, the current carrying capacity of the beams and the electrical impedance both scale approximately linearly with the beam height. Therefore, there is no particular advantage to making the beams taller. For the same transmission line capacity, one could use 8 beams with a height of 4 m instead of 14 beams with a height of 2 m. However, the ratio of the active beams to the passive beams would be worse and the cost per GW transmitted would be higher. In addition, the depth of the tunnel is directly related to the height of the beams. Deeper tunnels are more expensive and can encounter significant obstacles such as penetrating into the underground water table.

The corners of the rectangular beams are rounded to prevent corona discharge at the corners. In one embodiment, the two rounded corners at the top of the beam, and also the two rounded corners at the bottom of the beam merge to form a rounded top and a rounded bottom. The radius of the rounded top and bottom is equal to ½ the width of the beam. In cross-section, the beams have straight sides and then a rounded top and a rounded bottom. For a given applied voltage and a given separation between beams, the intensity of corona discharge at the rounded corners depends inversely on the radius of curvature of the corners. In one embodiment, this radius, and therefore the beam width, is chosen to be large enough so that there is no corona discharge anywhere on the beam during normal operating voltages. It is also chosen to be small enough so that upon transient overvoltage conditions, a corona will form at the rounded corners at a lower voltage than would be necessary for a corona or an arc to form on the flat, parallel surfaces of the beams. These two criteria create a desired range for the width of the beams and the radius of the rounded tops and bottoms. See FIGS. 2A and 2B for illustrations of the cross-section of the beams.

The rounded surfaces at the top and bottom of the beam will support a stable corona discharge over a wide range of voltages without forming an arc. The flat surfaces in the center of the beam will not support a stable corona discharge over a wide range of overvoltage situations without forming a potentially destructive arc. Flat surfaces exhibit a strong tendency to form arcs that can damage the surface of the beams. By choosing a sufficiently small radius of curvature for the corners of the beam, during an overvoltage situation, a stable corona discharge will form on the rounded surfaces at a lower voltage than is necessary to form a corona discharge and/or an arc on the flat surfaces of the beam. This stable corona discharge on the rounded surfaces will allow the transient energy of the overvoltage situation to be dissipated by the corona discharge safely and avoid situations in which potentially destructive arcs form between the beams.

As an example, with an applied voltage for each of the three phases of 442 kV to ground (765 kV between beams), in one embodiment, the beam dimensions are chosen to be 2 m high and 0.3 m wide, with a radius of curvature for each corner of 0.15 m. The minimum separation between adjacent beams is chosen to be 1.0 m. In this example, no corona would form anywhere on the beam with normal operating voltage. With a peak over-voltage that is 40% greater than the normal operating peak voltage, corona would begin to form at the rounded tops and bottoms of the beams. With a peak over-voltage that is 80% greater, corona would also form on the flat surfaces, and arcs may occur across the flat surfaces.

As another example, also with an applied voltage of 442 kV to ground (765 kV between beams), in another embodiment, the beam dimensions are chosen to be 2 m high and 0.66 m wide, with a radius of curvature for each corner of 0.33 m. The minimum separation between adjacent beams is chosen to be 1.0 m. In this example, no corona would form anywhere on the beam at normal operating voltages. With the greater radius of curvature at the corners than in the previous embodiment, the voltage at which a corona discharge begins at the corners is higher and a corona discharge would begin at the corners and at the flat surfaces of the beam at about the same voltage. Therefore, the goal of striking a corona discharge first at the rounded corners to dissipate a transient overvoltage safely would not be achieved. Thus, a ratio of the radius of curvature to beam separation of about 0.33 represents an approximate upper limit for the beam width.

Therefore, in one embodiment, the radius of curvature of the corners of the beam is chosen to be less than 0.33 of the separation between the flat surfaces of the adjacent beams. With any choice for the radius of curvature that is less than approximately 0.33 of the separation between the flat surfaces of the adjacent beams, in an overvoltage situation, a corona will strike on the rounded top and bottom of the beam before it will strike on the flat surfaces of the beam.

The minimum radius of curvature for the corners and the minimum spacing between the flat, parallel surfaces of the beam are both determined by the desired goal of avoiding a corona discharge anywhere on the beam during normal operating conditions. In one embodiment, the minimum spacing between beams is chosen to be 1 m. With air between the beams, this spacing would allow a voltage between the flat surfaces as high as 2000 kV before a corona discharge or an arc would strike. With air as the insulator between beams and a normal operating voltage of 442 kV to ground for each phase (765 kV between beams), a 1 m minimum spacing would provide a 1.8× safety margin compared to the peak voltage between the beams of 1082 kV. If the radius of curvature of the corners was as small as 0.08 m, then a corona discharge would just strike at the peak operating voltage of 1082 kV and there would be no safety margin for meeting the goal of no corona discharge anywhere during normal operation. Therefore, in one embodiment, the minimum radius of curvature is greater than 0.08 m, and the minimum beam width is 0.16 m.

Combining the maximum and minimum values, in one embodiment, with a normal operating voltage of 442 kV to ground for each phase (765 kV between beams), the separation between beams would be 1 m, and the radius of curvature of the corners would be between 0.08 m and 0.33 m. For other embodiments, with different spacing between the beams, it remains desirable to maintain the ratio of the radius of curvature of the top or bottom of the beam to the spacing between beams in the range of 0.08 to 0.33. Somewhere in the middle of this range would provide a safety margin of overvoltage before any corona discharge would form and another safety margin between the value of overvoltage at which a corona discharge would form on the rounded surfaces, but not yet on the flat surfaces. In one embodiment, with a normal operating voltage of 442 kV to ground for each phase (765 kV between the beams), the choice for the radius of curvature of the corners is 0.15 m; the choice for the beam width is 0.3 m and the choice for the minimum spacing between the flat, parallel surfaces of the beams is 1 m. The normal peak operating voltage between the beams would be 1082 kV. A corona discharge on the rounded corners would begin at approximately 1.4× this value. A corona discharge and/or arcing on the flat surfaces of the beam would begin at approximately 1.8× this value. Thus, the system would have a safety margin of about 30% overvoltage before an arc could initiate on the flat surfaces.

In another embodiment, the beams are hollow and have a circular or elliptical cross-section. Beams with a circular cross-section, inside a metallic tube, are common in the prior art. However, the addition of passive beams and a rectangular tunnel in embodiments of the current invention offer significant advantages over structures of the prior art. In some embodiments, hollow beams with circular or elliptical cross-section may be used without the need to place them inside a metallic tube. However, beams with a circular or elliptical cross-section have several disadvantages compared with rectangular beams with rounded corners as detailed above. Circular or elliptical cross-sectional shapes do not utilize the available space as well as the rectangular beams described above. For a given power transmission capacity, the structure will not be as compact. Also, they do not provide a means for dissipating transient over-voltage conditions by dissipating energy in a controlled corona discharge. Instead, especially with circular cross-section beams, an over-voltage will trigger an electric arc between the beams at their closest approach. This is also true of the elliptical cross-section, until the elliptical shape is very close to a rectangular cross-section with a rounded top and bottom, as described above. Finally, the transmission line impedance of a set of beams with circular or elliptical cross-sections will be higher than for beams having the rectangular cross-section with a rounded top and bottom, as described above. It is desirable to have the transmission line impedance match the impedance of the load. For this purpose, lower transmission line impedances are desirable and rectangular beams are preferred.

In one embodiment, the beams are made from aluminum metal. At a temperature of 40 C, aluminum metal has a resistivity of 2.85 µohm-cm and a skin depth of approximately 11 mm. To optimize the cost of the hollow aluminum conductors, it is highly desirable to use a thickness for the material that is not much greater than one skin depth. The beams may be completely hollow or they may include some internal structure for added mechanical strength, for ease of construction, and for ease of installation. In one embodiment (shown in FIG. 2A), the beams have two horizontal members to strengthen the beams and prevent the beams from expanding outwards in their width under a vertical load. In another embodiment, there are no horizontal members. (See FIG. 2B.) If used, these internal members are made of the same material as the beams and for convenience are of similar thickness. As an example, with beam dimensions of 2 m high, 0.3 m wide and a material thickness of 12.5 mm, made from almost pure aluminum, the resistance would be approximately 0.85 µohm per meter of length. With a maximum operating current of 10,000 amps and an operating voltage of 442 kV rms to ground (765 kV rms between phases), the power transmitted by each beam would be 4.4 GW. At full power, the amount of power lost due to resistive losses in the beams would be 85 watts per meter or about 2% per 1000 km. This percentage of resistive power loss for 1000 km length is about 3× better than conventional high-power transmission lines.

In one embodiment, the beams are much higher than they are wide. This makes them quite stiff against bending in the vertical dimension. They can be supported by insulating posts every 24 m with inconsequential bending in the vertical direction. In the horizontal direction, the beams will experience an electrostatic attractive force. However, the bending due to this force is also inconsequential. Since the beams will be mounted in a closed tunnel, they will not be subjected to large additional load forces due to high winds, snow, ice, or rain. The most significant opportunity to bend or dent a beam will be during installation. With the little bit of internal structure shown in FIG. 2A to reinforce the beam, and careful handling during installation, the probability of damage during installation is minimal.

In one embodiment, the array of long beams that are the electrical conductors is rectangular in cross-section. All of the beams are parallel to each other with the centers of each beam (in cross section) lying in a single plane. The number of "active" conductors, defined as conductors that are energized with an applied voltage from the power source, is a multiple of 3. This provides that each phase of the 3-phase electrical power will have the same number of active conductors per phase. Between the group of active conductors and each side wall is a single passive conductor. Thus, there are two passive conductors in each array. One is between the active conductors and the side wall to the right. The other is between the active conductors and the side wall to the left. (Please see FIG. 1.) A "passive" conductor is defined as a conductor that is grounded at both ends, and does not carry high-voltage from the power sources. Each of the passive conductors will have current that is returned from the loads at one end of the power transmission line to the power source at the other end. When the loads for all three phases are balanced, then the current in one of the passive beams will be exactly the opposite of the current in the other passive beam. The currents in the passive beams will add to zero. However, there may be an imbalance in the loads of the 3-phases. With an imbalance, there will a net current flowing back to the power sources. With the presence of the passive beams, these return or ground currents will flow through the passive conductors, rather than through the earth. For rural transmission lines that transmit modest levels of power, allowing the return currents to go through the earth may be acceptable. However, for very high power transmission lines like this invention, the return or earth currents can easily be as large as 10,000 amps. This amount of current would be difficult to conduct through the earth without disturbing underground animals, insects and plants. The passive beams provide a safe, low resistance and low power dissipation path for the return currents.

The passive beams serve two functions. First, as already mentioned above, the passive conductors provide a return path for the current flowing in the active beams located to the far right or far left of the array, and for the ground current when the loads of each of the 3-phases are not equal and the power transmitted to each of the 3-phases is not equal. Second, the passive beams complete the transmission line for the first and last active beams that are adjacent to the passive beams. This allows all of the active beams to have the same electrical impedance. It is important for each phase of the 3-phase electricity to have the same impedance. The impedance of the transmission line translates into some amount of inductance or capacitance depending on the value of the load and the length of the line. When the impedances of the transmission conductors for each phase are not matched, as is typical in prior art structures, then extra inductance or capacitance must be added at the loads. This adds extra cost and makes it difficult to have exactly the same phase delay for each phase. On the other hand, when the impedances are matched, this additional cost and complexity are eliminated.

In one embodiment, the conductors are formed from interconnected beams with a cross-section that is 2 m high×0.3 m wide, with rounded tops and bottoms, and spaced about 1 m apart, with air in the space between conductors. The impedance of these active conductors, with an identical conductor on either side is about 55 ohms. Full load is the load at which the power loss is 2% over a distance of 1000 km. For this embodiment, with the dimensions listed above, at full load, each active conductor is carrying 10,000 amps at 440 kV to ground (both are rms). Thus, the maximum power transmitted by each conductor is 4.4 GW. This represents a load resistance at full load of 44 ohms. Thus, at full load, the transmission line impedance is greater than the load. For transmission line lengths less than 1250 km (for 60 Hz), the length of the transmission line is less than ¼ of a wavelength at the power frequency, and the reactance of the transmission line is inductive. At 80% of full load, the line's impedance and the load impedance at matched. This condition would allow the transmission line to be of any length and be neither inductive nor capacitive. This is a highly desirable outcome and likely to be achieved during a majority of the hours per day and days per year. Below 80% load, the line is capacitive. Since most loads are inductive, this is also a highly desirable outcome. It will partially eliminate the need for banks of capacitors to balance the inductance of the loads.

In another embodiment, as shown in FIG. 3C, the "passive" conductors can be replaced by a plate 308 of aluminum or copper on each of the side walls. These plates would need to have about the same conductance as the beams and would have to use approximately the same thickness of material as the conductor beams, assuming a similar electrical conductivity. Otherwise the resistive power losses in the plate would be too large. The plate would have to extend at least 1 m above and below the top and bottom of the active beam. The spacing between the adjacent surface of the nearest active beams and either side wall would have to be ½ the spacing between adjacent surfaces of the active beams in the center of the array. Otherwise the impedance of the conductors closest to the wall would not be the same as the conductors in the center of the array. Thus, to have the same level of protection for over-voltage transients and avoid arcs to the flat surfaces of the conductor beams, the spacing between all beams would have to be greater than for the array with the passive beams. Otherwise, the air spaces between the active beams and the conductive plates on the side walls would be the first to arc during a transient over-voltage condition. Also, the space between the flat surfaces and side walls would arc before the corona discharge at the tops and bottoms of the active beams could dissipate much of the transient energy.

In addition, with a plate of metal on each of the two side walls, instead of a passive beam, thermal expansion is more difficult to handle. There would have to be room for the metal plate to meander and change the amount of meander with temperature. Therefore, it would have to be held some distance away from the side wall and somehow supported so that it could move relative to the side wall. Finally, the amount of metal required for either the side wall plates or the passive beams is about the same. This embodiment is still different than the prior art, in that metal plates are only required on the side walls and not on all four walls of the tunnel. Since the top and bottom walls of the rectangular tunnel are much longer than the side walls, this difference from the prior art still creates a substantial cost savings.

Each of the long-distance conductors for electrical power is constructed from a series connection of multiple beam sections. In one embodiment, each beam section is 12 m long. Conventional trucks restrict the length of loads to 12 m. Beams longer than 12 m would require special trucks and special permits. These 12 m long beam sections are welded together at the construction site to form the very long, electrically continuous beams that transmit the electricity. Welded joints (406 in FIG. 4) between the beam sections are very reliable, provide low resistance electrical connections, and provide high strength mechanical connections.

Figure 5:
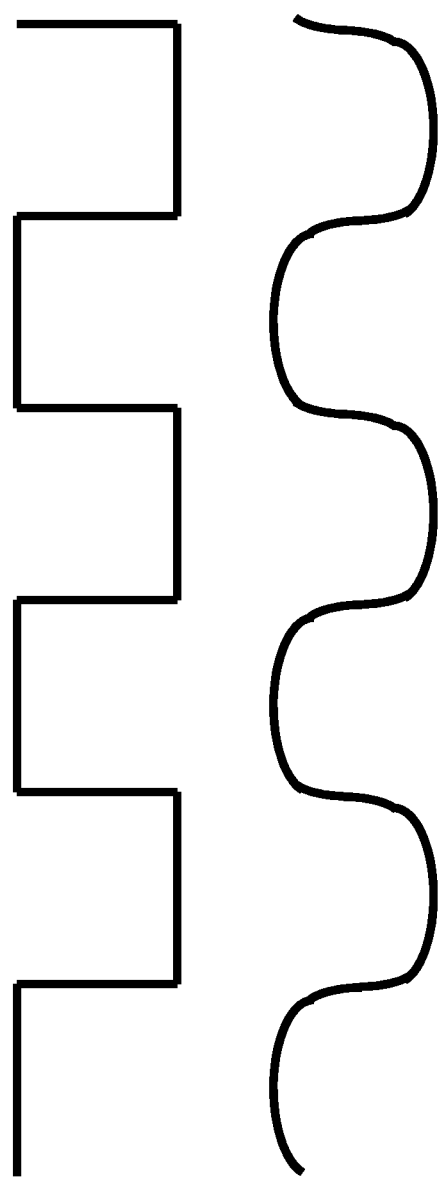
FIG. 5—(Prior Art) An oil pipeline as seen from above with sideways jogs and bending to allow for thermal expansion or contraction, as seen from above.

Thermal expansion of the long beams is an important consideration. When the metal beams carrying electric current get hot, they expand. When they cool, they contract. The beams must be designed so that they can expand and contract while still maintaining a minimum spacing between them. In one embodiment, with an AC voltage of 765 kV between the beams, the minimum spacing must be 1 m. In the prior art, for example for oil or gas pipelines, thermal expansion is allowed by making sideways jogs in the pipeline. Thermal expansion or contraction then causes the length of pipe in the sideways jogs to bend. FIG. 5 shows a typical design for an oil or gas pipeline with side to side meander to allow for thermal expansion or contraction. Also shown is the pipeline with bends to absorb additional total length due to thermal expansion.

Unfortunately, the prior art approach will not work well for an array of electricity carrying beams that must be close to a constant distance from each other over their entire length. In the prior art approach used for oil and gas pipelines, the spacing between beams is poorly controlled near the bends. In one embodiment, each section of the beams has one end cut with a slight angle from the perpendicular, circa 3 degrees, and the other end cut perpendicular to its length. The beam sections are then welded together to form a single long beam that meanders from side to side in the shape of a triangular wave. (See FIG. 6.)

The amount of side-to-side meander is chosen to allow for an amount of thermal expansion or contraction due to a temperature change of +−40 C. When the temperature increases, the meandering, long beam expands and the side-to-side meander must increase in amplitude to accommodate the increased total length. When the temperature decreases, the long beam contracts and the side-to-side meander must decrease to accommodate the reduced total length.

If the adjacent beams are at exactly the same temperature, then their contraction or expansion would be the same and the amount of their side-to-side meander would increase or decrease by the same amount. The spacing between them would not change. However, for a variety of reasons, adjacent beams may not be at the same temperature. For example, the loads for each phase may be different and the beams may be carrying different amounts of current and producing different amounts of heat due to resistive losses in the beams. These differences in temperature will result in differences in the amount of side-to-side meander. Therefore, in one embodiment, a little bit of extra spacing (such as 0.2 m) is provided between the beams to allow for differences in the amount of side-to-side meander, and still maintain the minimum spacing (e.g. 1 m minimum spacing for a voltage of 765 kV).

Thus, for this embodiment, the total spacing between the beams is 1.2 m, rather than the minimum spacing of 1 m. (See FIGS. 1, 3A and 3B.)

The supports for the conducting beams must be insulators capable of withstanding very high voltages, such as 765 kV rms, which is 1082 kV peak. In addition, due to overloads, lightning strikes on above-ground transmission lines that might connect to the electricity transmission structures described herein, or sudden changes in the loads, transient over-voltages can occur. The insulators must withstand these transient over-voltages, as well. Arcs within or along the insulators can cause damage and eventually cause the insulators to fail. This must be avoided.

Above-ground transmission lines that are not in sealed tunnels use very long insulators (typically 3 m long), often made with fiberglass-epoxy cores and then silicone shells on the outside. The silicone shells are hydrophobic and are shaped to resist the formation of conducting water films that would reduce the insulating properties of the structure. In one embodiment, the beams of each conductor are held one meter from the floor of the tunnel and one meter from the ceiling of the tunnel by insulating posts. These posts can also be made of fiberglass-epoxy and may also be coated with silicone or employ silicone shells. Unlike the insulators used for above-ground power transmission lines, these posts will see a compressive load, rather than a tensile load. Therefore, they are constructed differently. The construction of fiberglass insulators for compressive loads is standard and known to practitioners of the art.

The tunnel in which the conductors are placed is sealed to water incursion and heated to avoid high humidity that might cause fog or water condensation. Since the tunnel is sealed, the inside of the tunnel cannot experience rain or snow. Therefore, the formation of water films on the insulating posts is avoided. In turn, this allows the insulating posts to be much shorter. The separation between the conducting beams and the walls of the tunnel is limited by the length of air necessary to maintain sufficient insulation, avoid arcs and avoid corona discharge, except in the condition of significant over-voltage. The air gap spacing is not determined by the length of the posts necessary to provide sufficient insulation.

Figure 4:
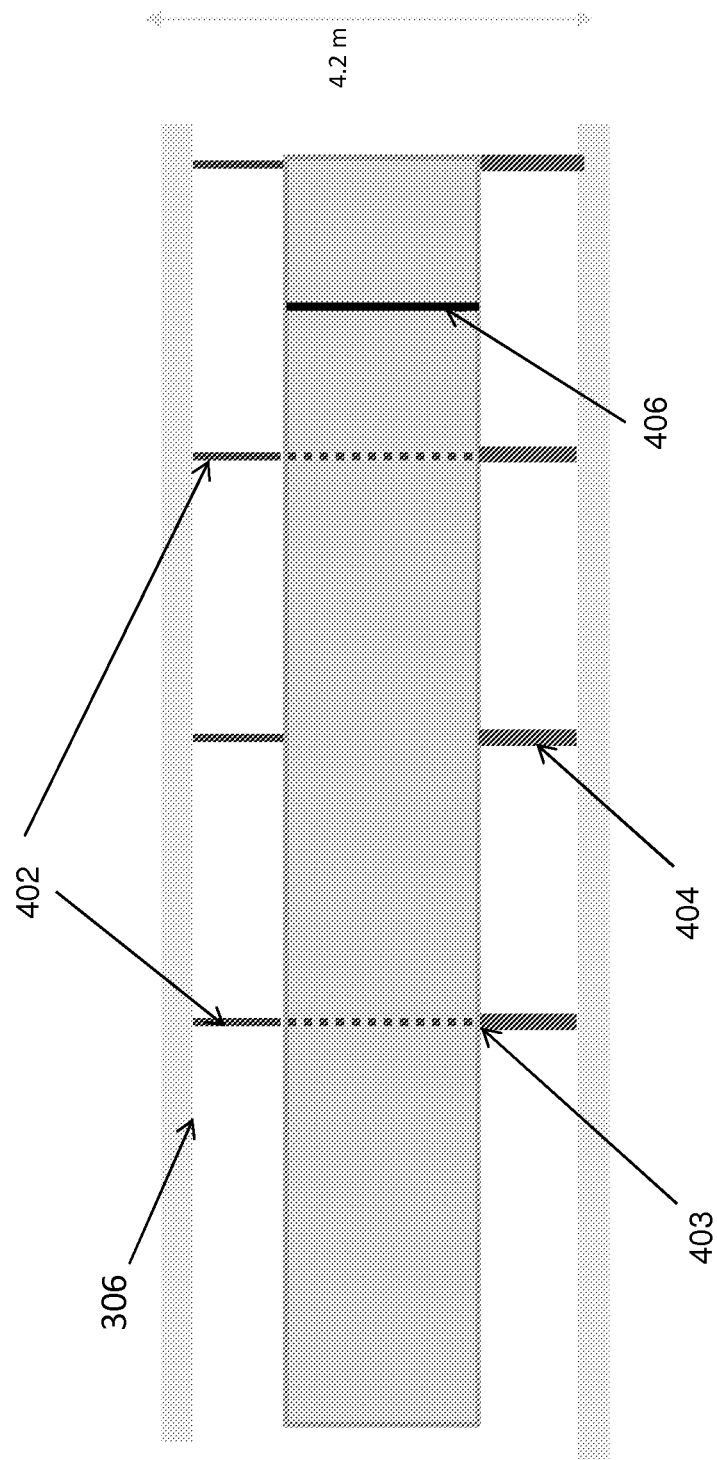
FIG. 4—A rectangular tunnel as viewed from the side walls, showing one embodiment for the insulated posts that penetrate through the beams to support the beams and the ceiling, and also the insulated posts positioned in the air space between beams to additionally support the ceiling. Also, shown is one of the periodic welds that connect the segments of the beam into a single continuous beam.
Figure 6:
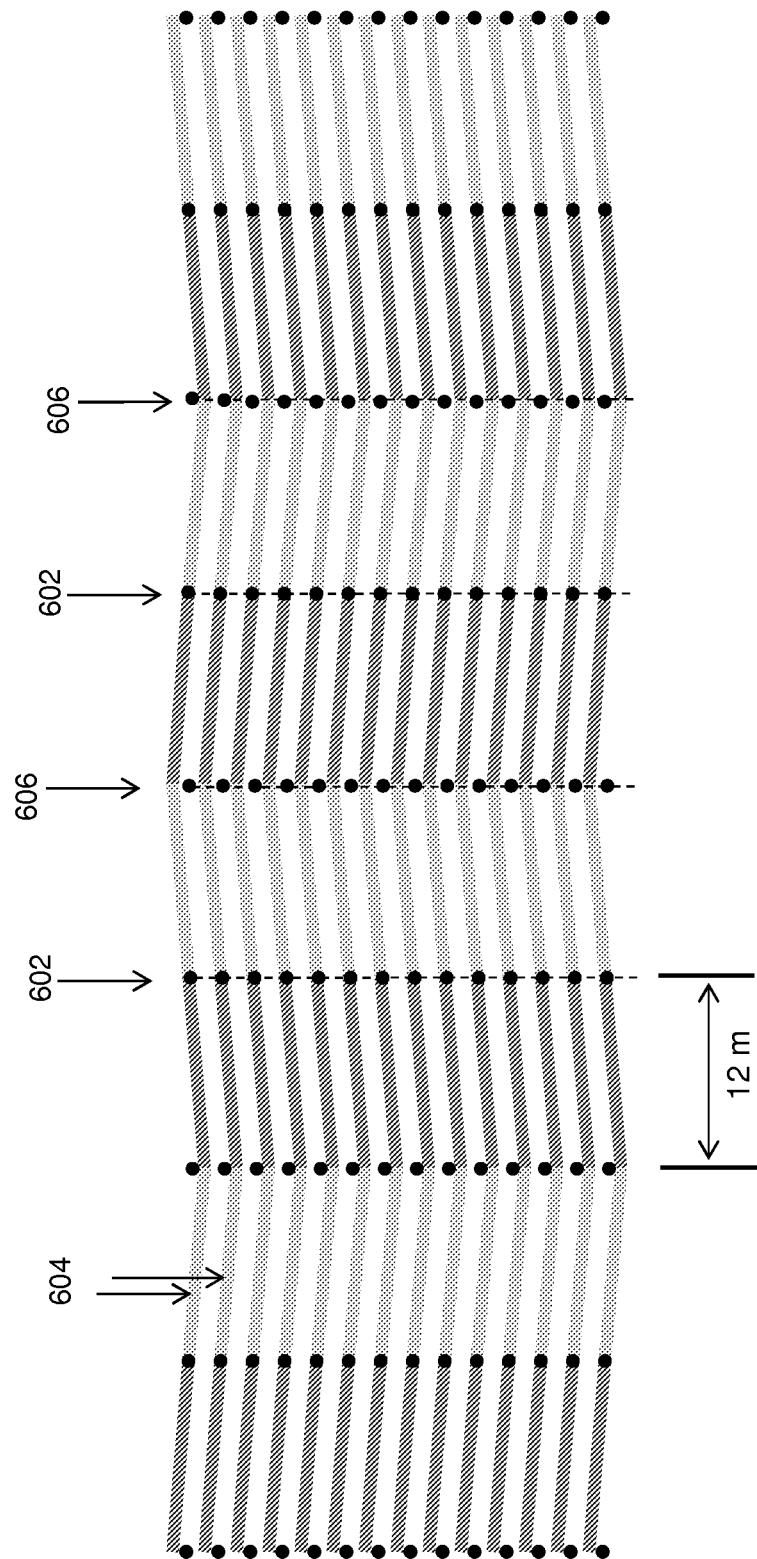
FIG. 6—An array of 12 active+2 passive beams as seen from above, showing the meander of the beams along their length in the shape of a triangle wave, and also showing how the long beams are fabricated by welding shorter segments together. Also shown are the rows of insulating posts that penetrate through the beams, alternating with rows of insulating posts that are located in the air space between adjacent beams.

In one embodiment, shown as a side view in FIG. 4, each post of a first set of posts 402 has a supporting surface 403 underneath the bottom of the beams. Then, the post decreases in diameter slightly and proceeds through the beam and out the top of the beam to contact and support the ceiling 306. In one embodiment, shown in FIG. 6, the posts are spaced every 24 m along the beams, at the points along the beams where the amount of triangle wave, side-to-side meander has the value of zero. A second set of insulating posts 404 may be added to provide additional support to the ceiling. This second set of posts is positioned in the spaces between the beams rather than contacting or penetrating the beams themselves. FIG. 6 shows how the combination of rows 602 of posts that penetrate beams 604 and rows 606 of posts positioned between beams 604 allows for shorter distances between the rows of posts that support the ceiling. For even more support of the ceiling, additional sets of posts may be placed periodically in the space between the beams.

In another embodiment, as shown in cross section in FIG. 3B, instead of a single post supporting the beams from the ground at a series of positions along the beam length, two posts 302A and 302B are used for each beam at each of those positions. The posts are mounted from the ground to each beam at an angle (typically 15-45 degrees from the vertical and 30-90 degrees relative to each other). The use of two posts, mounted at angles to each other, provides more strength to resist sideways movements. Sideways movement forces could be created by thermal expansion and contraction. To preserve the minimum spacing between adjacent beams, it is important that the post or pair of posts have sufficient sideways strength to resist the sideways forces and prevent the beams from moving sideways (i.e. along the plane of the beam centers) at the locations every 24 m, where the amplitude of the sideways, triangle wave meander is zero, and where any sideways motion due to temperature changes should be prevented. It is at these periodic locations that the sideways displacement of the beams is initially zero and also approximately zero with temperature changes. These periodic locations are stationary. With temperature changes, the beams have more or less sideways displacement in between these stationary locations. (See FIG. 6.)

Aspects of the construction of the tunnel are of great importance in achieving the benefits potentially provided by the current invention. The tunnel can be located above ground, completely underground or partially above and partially below ground. It can be constructed from concrete or reinforced concrete, using standard construction techniques. It must be well sealed to prevent water incursion. There are standard techniques, well known to practitioners of the art, for sealing the junctions between side walls and the floor, between the side walls and the ceiling and between concrete plates used to construct the ceiling. There are also standard techniques, well known to practitioners of the art, for providing expansion joints for concrete walls, floor and ceiling, and also for sealing all of these expansion joints to prevent water incursion.

A major advantage provided by careful design of the tunnel is the ability to control the amount of heat conducted out of the tunnel and, thereby, retain the heat from the resistive losses in the transmission line conductors to warm the tunnel and avoid conditions of fog or condensation inside the tunnel. The retention of the right amount of heat is accomplished through careful thermal design of the ceiling and other walls. Retention of too much heat would make the tunnel too hot and increase the power loss in the transmission line conductors. Retention of too little heat would not warm the tunnel enough to prevent the formation of fog or condensation inside the tunnel.

In one embodiment, the thickness and composition of the ceiling, floor, and side walls are controlled so that the thermal conductivity through the ceiling to the air above the ceiling is about 2-4 watts per square meter per ° C. and the thermal conductivity through the side walls and floor is very small. This can be accomplished with concrete by using a variety of combinations of thicknesses and concrete compositions. In one embodiment, using concrete for the ceiling material, the thickness of the concrete ceiling between the outside air and the inside of the tunnel is 0.25-0.5 m. The thermal conductivity of the concrete is controlled to be 1 watt per meter per ° C. Combined with a thickness of 0.25-0.5 m, this achieves the desired 2-4 watts per square meter per ° C. As examples, this thermal conductivity can be achieved by controlling the amount of water in the concrete. It can also be achieved by controlling the density and thermal conductivity of the aggregate used to make the concrete. It can also be also be controlled by the amount of steel reinforcing material that is used. It can also be controlled by the arrangement of the steel reinforcing materials. For example, the steel can be formed into thin bars that are almost the same as the thickness of the concrete. These steel bars will conduct heat from the inner surface of the ceiling to the outside air. The percentage of area occupied by these steel bars will modify the thermal conductivity of the ceiling. Finally, the thermal conductivity of the ceiling, walls, and floor can also be controlled by adding thermally insulating materials, such as sand or fiberglass just outside of the ceiling, walls, and floor to limit their effective thermal conductivity.

In one embodiment, as described above, the thermal conductivity of the ceiling is controlled to be 2-4 watts per square meter per ° C. Almost all of the heat leaves the tunnel through the ceiling. There is insulation around the other walls and floor so that little heat is conducted from the side walls or floor of the tunnel. This thermal insulation can accomplished in many ways, such as by filling the area under the floor and outside of the side walls with a thick layer of sand and then gravel or other thermal insulation, or with the use of thermally insulating materials, such as fiberglass. Heat is conducted by convection and radiation from the 14 beam conductors to the ceiling and then conducted through the ceiling to the air above and outside the tunnel.

In another embodiment, the floor, the side walls and the ceiling all conduct heat out of the tunnel. The thermal conductivity of all of the walls together is controlled so that the total thermal conductivity is about 0.85-1.7 watts per square meter per ° C. over the total surface area of all of the walls, ceiling and floor.

The amount of heat generated by the resistance of the electrical beam conductors at full load (10,000 amps in each active beam and 5000 amps in each passive beam), is 1100 watts per meter of length. Corona discharge is avoided under normal operating conditions by the choice of beam width and adds little to the total amount of heat generated during normal operating conditions. Finally, the very slight amount of extra resistive power dissipation at the welded interconnections adds an insignificant amount of heat over the 12 m length of the beams. Therefore, the total electrical power to heat the tunnel at full load is about 1100 watts per meter of length. Since, in one embodiment, the beams are 0.3 m wide, spaced 1.2 m apart (to allow for extra meander when adjacent beams are at different temperatures), and 1.5 m from the side walls, the total length of the ceiling is approximately 23 m. Hence the power density of heat flowing to and through the ceiling is approximately 48 watts per square meter of ceiling area. With a total thermal conductivity of 2-4 watt per sq m per C, the temperature just inside the tunnel at the ceiling will be 12-24° C. above the temperature of the outside of the ceiling, where the ceiling is in contact with the outside air.

With 12° C.-24° C. rise in temperature over ambient, the relative humidity is reduced greatly. Therefore, even in regions of the tunnel that may be vented to outside air, the relative humidity will be reduced and conditions of fog or condensation will be prevented. Even at one half of full power, the temperature rise is still sufficient to prevent conditions of fog and condensation. Furthermore, venting to outside air can be minimal. No fresh air is required in the tunnel during normal operation. In one embodiment, only enough venting is used to exhaust the NOx or ozone gases that may occasionally be formed during corona discharge under transient over-voltage conditions. Finally, the walls of the tunnel have a substantial thermal mass and will retain heat. Thus, in the early morning, when the air temperature outside the tunnel is at its low point, the air inside the tunnel will be much hotter than the outside air. This will further prevent fog or condensation in the early morning when the humidity of the outside air is often at its high point.

In another embodiment, the tunnel may not be underground. For this embodiment, the floor, and/or the ceiling and/or the side walls may have a controlled thermal conductivity. The combination of the thermal conductivities of all of these elements is controlled to obtain an overall thermal conductivity in the range of 2-4 watts per sq m of surface area above the transmission structure, and a temperature rise in the tunnel of 12-24° C., when the conductors are operating at full power. Again, at full power or half-power, this temperature rise is sufficient to greatly reduce the relative humidity and prevent fog or condensation of water on the ceiling or walls of the tunnel.

In some embodiments, the thermal conductivity of materials used in the ceiling, walls and/or floor of the tunnel may be carefully controlled by composition-concrete or reinforced concrete, for example, having a precise amount of water per kg of total weight, a precise thickness—typically in the range 0.1 m to 0.5 m—and possibly the addition of thermally insulating materials like fiberglass to achieve the desired goal, such as ensuring that the heat generated by the electrical resistance of the beams heats the tunnel more than 5° C. above the temperature of the air outside of the tunnel.

The transmission line structures described herein are very compact. Some embodiments could be placed underneath highways, with the concrete surface of the highway forming a part of the ceiling of the tunnel. Some embodiments could be placed alongside or above a highway. Any of these locations would be advantageous since the right of way for highways already exists. Acquiring new right of way is expensive, slow, and often very difficult.

Finally, in some embodiments, magnetic shielding may be desired. This can easily be accomplished by placing a very thin sheet of iron (or iron with 3% silicon) into the concrete walls toward the inside of the tunnel. The sheet of iron (or iron with 3% silicon) can be very thin (circa 0.2-0.4 mm) and the additional expense is not significant. This shielding will reduce the magnetic field to levels of around 1 mT, which has been shown to be safe for long-term human and animal exposure. This shielding may also be useful for preventing eddy currents in steel reinforcing bars, if steel-reinforced concrete is used. Eddy currents in the reinforcing materials can also be reduced by using thin steel wire, rather than thick steel rebar as the reinforcement.

Although the description has been described with respect to particular embodiments thereof, these particular embodiments are merely illustrative, and not restrictive. It will also be appreciated that one or more of the elements depicted in the drawings/figures can also be implemented in a more separated or integrated manner, or even removed or rendered as inoperable in certain cases, as is useful in accordance with a particular application. Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A long-distance, 3-phase, AC electricity transmission structure, comprising: an array of beams for carrying 3-phase AC electricity, the array comprising: a sub-array of 3N active beams, wherein N is an integer; a first passive beam, grounded at both ends, on the right side of the sub-array of active beams; and a second passive beam, grounded at both ends, on the left side of the sub-array of active beams; wherein the centers of the cross-section of each of the active and passive beams lie in a single line and in a single plane, the single plane including the longitudinal axis of the array; wherein each of the active beams has the same electrical transmission impedance as any other of the active beams; and wherein each beam of the array comprises segments welded together at a slight angle, so that each beam meanders to the right and left when viewed from above along the length of the array, along axes orthogonal to the longitudinal axis of the array.

2. The structure of claim 1, additionally comprising:
an electrically insulating gas or mixture of gases in the space between the beams of the array;
a tunnel of rectangular cross-section with either 90 degree or rounded corners, the tunnel comprising two side walls, a ceiling that connects directly to the side walls, and a floor that connects directly to the side walls, at least one of the ceiling, the side walls, and the floor of the tunnel comprising a material that is a poor electrical conductor, wherein the array of beams is mounted within the tunnel and wherein no part of any beam directly contacts the side walls, ceiling or floor; and
a plurality of insulating structures supporting the beams of the array either from the floor of the tunnel or from the ceiling of the tunnel or both, the insulating structures corresponding to each beam being located at periodically spaced locations along the length of the corresponding beam.

3. The structure of claim 2, wherein the tunnel is sealed such that the array of beams is protected from weather, such as rain, lightning, fog or snow, and from water incursion.

4. The structure of claim 3, wherein the ceiling, the walls, and the floor of the tunnel comprise one or more materials having carefully controlled thermal conductivity, such that the heat generated by the electrical resistance of the beams heats the tunnel to a predetermined value above the temperature of the air outside of the tunnel.

5. The structure of claim 2, wherein at least one of the ceiling, walls, and floor of the tunnel comprises a ferromagnetic shielding material, such as iron, such that magnetic field penetration from within the tunnel to the external environment is minimized.

6. The structure of claim 1, wherein the cross sections of the beams of the array are rectangular with rounded corners.

7. The structure of claim 6, wherein the rectangular beams are oriented so that the largest dimension (height) of the cross-section of each beam is perpendicular to the single plane.

8. The structure of claim 6 wherein the corners of each rectangular beam are rounded with radii of curvature equal to ½ of the beam width (smallest dimension of the beam in cross-section) so that the corners of the beam merge to form a half-circle in cross-section at the top and the bottom of the beam.

9. The structure of claim 8, wherein the ratio of the radius of curvature of each corner of the rectangular beam to the spacing between beams is chosen to lie between 0.08 and 0.33 such that under normal operating voltages no corona forms anywhere on the beams, and such that upon overvoltage conditions, a corona forms on the rounded top and bottom of the beams at a lower voltage than is necessary to cause either a corona or an arc to form on the flat surfaces of the beams.

10. The structure of claim 1, wherein the beams of the array comprise aluminum, the segments for each beam of the array being welded together to form a continuous beam with low electrical resistance and strong mechanical connections between the segments without any overlaps or changes in height or width at the junction between the beam segments.

11. The structure of claim 1, wherein when viewed from above along the length of the array, the meander is in the shape of a triangle wave to allow for thermal expansion.

12. The structure of claim 11, wherein the right and left meanderings of all the beams in the array are synchronized so that each beam position moves to the right or to the left at the same distance along its length and in the same amount, such that the spacing between each beam and its adjacent beam or beams remains approximately constant throughout its length.

13. The structure of claim 12, wherein each insulating structure at each of the periodically spaced locations for each beam comprises two insulating posts mounted such that they form an angle with respect to each other of 30 to 90 degrees.

14. A long-distance, 3-phase, AC electricity transmission structure, comprising: an array of 3N metal active beams for carrying 3-phase AC electricity wherein N is an integer; and a tunnel of rectangular cross-section with either 90 degree or rounded corners, the tunnel comprising two side walls, a ceiling that connects directly to the side walls, and a floor that connects directly to the side walls, the array of beams being mounted within the tunnel and no part of any beam directly contacting the side walls, ceiling or floor; wherein the two side walls of the tunnel are lined with a material having a conductivity similar to the conductivity of the metal of the active beams; wherein at least one of the ceiling or the floor of the tunnel comprises a material that is a poor electrical conductor; wherein the spacing between the adjacent surface of the nearest active beams and either side wall is equal to half the spacing between adjacent surfaces of the active beams in the center of the array; and wherein each beam of the array comprises segments welded together at a slight angle, so that each beam meanders to the right and left when viewed from above along the length of the array, along axes orthogonal to the longitudinal axis of the array.

15. The structure of claim 14, additionally comprising:
an electrically insulating gas or mixture of gases in the space between the beams of the array; and
a plurality of insulating structures supporting the beams of the array either from the floor of the tunnel or from the ceiling of the tunnel or both, the insulating structures corresponding to each beam being located at periodically spaced locations along the length of the corresponding beam.

16. The structure of claim 14, wherein the tunnel is sealed such that the array of beams is protected from weather, such as rain, lightning, fog or snow, and from water incursion.

17. The structure of claim 16, wherein the ceiling, the walls, and the floor of the tunnel comprise one or more materials having carefully controlled thermal conductivity, such that the heat generated by the electrical resistance of the beams heats the tunnel to a predetermined value above the temperature of the air outside of the tunnel.

18. The structure of claim 14, wherein the cross sections of the beams of the array are rectangular with rounded corners.

19. The structure of claim 18, wherein the rectangular beams are oriented so that the largest dimension (height) of the cross-section of each beam is perpendicular to the plane of the tunnel ceiling.

20. The structure of claim 19, wherein the corners of each rectangular beam are rounded with radii of curvature equal to ½ of the beam width (smallest dimension of the beam in cross-section) so that the corners of the beam merge to form a half-circle in cross-section at the top and the bottom of the beam.

21. The structure of claim 20, wherein the ratio of the radius of curvature of each corner of the rectangular beam to the spacing between beams is chosen to lie between 0.08 and 0.33, such that under normal operating voltages no corona forms anywhere on the beams, and such that upon over-voltage conditions, a corona forms on the rounded top and bottom of the beams at a lower voltage than is necessary to cause either corona or an arc to form on the flat surfaces of the beams.

22. The structure of claim 14, wherein the beams of the array comprise aluminum, the segments for each beam of the array being welded together to form a continuous beam with low electrical resistance and strong mechanical connections between the segments without any overlaps or changes in height or width at the junction between the beam segments.

23. The structure of claim 14, wherein when viewed from above along the length of the array, the meander is in the shape of a triangle wave.

24. The structure of claim 23, wherein the right and left meanderings of all the beams in the array are synchronized so that each beam position moves to the right or to the left at the same distance along its length and in the same amount, such that the spacing between each beam and its adjacent beam or beams remains approximately constant throughout its length.

25. The structure of claim 24, wherein each insulating structure at each of the periodically spaced locations for each beam comprises two insulating posts mounted such that they form an angle with respect to each other of 30 to 90 degrees.

* * * * *